United States Patent [19]

Pendse et al.

[11] Patent Number: 5,793,847
[45] Date of Patent: Aug. 11, 1998

[54] METHOD AND APPARATUS FOR TRANSFERRING A DATA CALL

[75] Inventors: Ajit Pendse, Portland; Gregory H. Kisor, Beaverton, both of Oreg.

[73] Assignee: Intel Corporation, Santa Clara, Calif.

[21] Appl. No.: 577,914

[22] Filed: Dec. 21, 1995

[51] Int. Cl.$^6$ .................................................. H04M 11/00
[52] U.S. Cl. ................................. 379/93.14; 379/93.31
[58] Field of Search ........................... 379/94, 98, 99, 379/93, 212, 210, 211, 157, 165, 233, 93.28, 93.31, 93.32, 93.34, 93.08, 93.09, 93.14

[56] References Cited

U.S. PATENT DOCUMENTS

| | | | |
|---|---|---|---|
| 4,697,281 | 9/1987 | O'Sullivan | 379/59 |
| 4,852,151 | 7/1989 | Dittakavi et al. | 379/93.35 |
| 5,199,071 | 3/1993 | Abe et al. | 379/98 |
| 5,333,182 | 7/1994 | Aoki | 379/94 |
| 5,473,676 | 12/1995 | Frick et al. | 379/99 |

*Primary Examiner*—Stella Woo
*Attorney, Agent, or Firm*—Blakely, Sokoloff, Taylor & Zafman

[57] ABSTRACT

In one embodiment, the operating logic of a first communication interface device, a callee, is enhanced to include logic for transferring a direct inward dial data call it received from a second communication interface device, the caller, to a third communication interface device, the transferee, where the first communication interface device and the third communication interface device are coupled to the same PBX. The operating logic of the second and the third communication interface devices, the original caller and the transferee, are also enhanced to include logic for cooperating with the first communication interface device to effectuate the transfer. In one embodiment, the operating logic of the first, second, and third communication interface devices are further enhanced with the enhancements provided to the second and third, first and third, and first and second communication interface devices respectively, to allow each of the three communication interface devices to be the caller having its call transferred, the transferor callee, as well as the transferee callee, at different points in time.

28 Claims, 7 Drawing Sheets

METHOD AND APPARATUS FOR TRANSFERRING A DATA CALL

BACKGROUND OF THE INVENTION

1. Field of the Invention

The present invention relates to the field of data communication. More specifically, the present invention relates to communication interface devices, including data circuit-terminating equipment (DCE), also known as modem.

2. Background Information

As computer and telecommunication technologies continue to advance, more and more data processing equipment are equipped with communication interface devices, from conventional DCEs to simultaneous voice and data (SVD) modems for POTS connections, to ISDN based interface devices, for the purpose of conducting data communication and/or audio and video exchanges over the different transport types. In this context, the data processing equipment are also referred to as data terminal equipment (DTE).

Typically, two communication interface devices interconnect two DTEs together by jointly establishing a connection in accordance with a data communication protocol, which usually dictates among other things the transmission of a carrier signal. Failure to receive this carrier signal from the other side in the prescribed time frame is construed by most interface devices as the loss of connection. In addition, depending on the sophistication of the protocol, the two interface devices might have jointly established a data transmission rate, a data blocking factor, whether the data will be exchanged with or without error correcting, and/or compression/decompression, and the compression/decompression technique etc.

Today, by virtue of the direct inward dialing capability of modern private access branch exchanges (PBX), a DTE, through its communication interface device can actually initiate data communication with another DTE, having a compatible communication interface device, located "behind" the PBX, by calling the compatible communication interface device directly. However, because of the carrier signal is typically required in a much shorter time than the time it takes a PBX to transfer a call, thus unlike a direct inward dial voice call, the callee DTE cannot cause its communication interface device to transfer the call to yet another DTE also having a compatibly equipped communication interface device connected to the same PBX.

Experience has shown that for many modern data and/or voice applications, it is desirable to be able to transfer such a direct inward dial data call from one callee DTE to another DTE, having a compatibly equipped communication interface device connected to the same PBX. As will be disclosed in more detail below, the present invention achieves this and other desirable results.

SUMMARY OF THE INVENTION

In accordance with one embodiment of the present invention, the operating logic of a first communication interface device, a callee, is enhanced to include logic for transferring a direct inward dial data call it received from a second communication interface device, the caller, through a PBX, to a compatibly equipped third communication interface device, the transferee, coupled to the same PBX. The operating logic of the second and the third communication interface devices, the original caller and the transferee, are also enhanced to include logic for cooperating with the first communication interface device to effectuate the transfer.

More specifically, for the purpose of enabling the second communication interface device, the caller, to accommodate having the direct inward dial data call it initiated to be transferred, its operating logic is enhanced to temporarily suspend looking for the carrier signal from the callee, upon being informed that the call is being transferred, if the second communication interface device is a modem. On the other hand, if the second communication interface is an Integrated Service Data Network (ISDN) compliant interface instead, its operating logic is enhanced to temporarily suspend looking for the frame alignment signal from the callee. The operating logic of the second communication interface device, the caller, is also enhanced to initiate a retraining procedure, when it resumes looking for the carrier/frame alignment signal from the callee, if the second communication interface device, the caller, was also informed to assume loss of protocol when it resumes looking for the carrier/frame alignment signal from the callee.

Additionally, for the purpose of enabling the first communication interface device, the transferor callee, to be able to transfer the direct inward dial data call it receives, its operating logic is enhanced to inform the second communication interface device, the caller, of the transfer, with or without informing it to assume loss of protocol when it resumes looking for the carrier/frame alignment signal from the callee, depending on whether the "host" DTE of the first communication interface device, the transferor callee, has an alternate connection to the "host" DTE of the desired transferee. The operating logic of the first communication interface device, the transferor callee, is also enhanced to inform it's "host" DTE of the operating parameters for handling the data call, thereby allowing the information to be provided to the "host" DTE of the third communication interface device, the transferee callee, if the two "host" DTEs have an alternate connection. Lastly, the operating logic of the first communication interface device, the transferor callee, is further enhanced to inform the PBX of the identify of the transferee.

Furthermore, for the purpose of allowing the third communication interface device, the transferee callee, to be able to accept a transferred call, its initialization logic is enhanced to initialize itself to a particular set of operating parameters, under the control of its "host" DTE. The initialization logic of the third communication interface device, the transferee callee, is also enhanced to skip the "standard" handshake and negotiations for establishing these operating parameters if it has so initialized itself prior to answering a call.

Lastly, the operating logic of the first, second, and third communication interface devices are preferably further enhanced with the enhancements provided to the second and third, first and third, and first and second communication interface devices respectively, to allow each of the three communication interface devices to be the caller having its call transferred, the transferor callee, as well as the transferee callee, at different points in time.

BRIEF DESCRIPTION OF DRAWINGS

The present invention will be described by way of exemplary embodiments, but not limitations, illustrated in the accompanying drawings in which like references denote similar elements, and in which.

DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, some method steps are described as separate steps, however, it should not be construed that these steps are necessarily order dependent.

Figure 1:
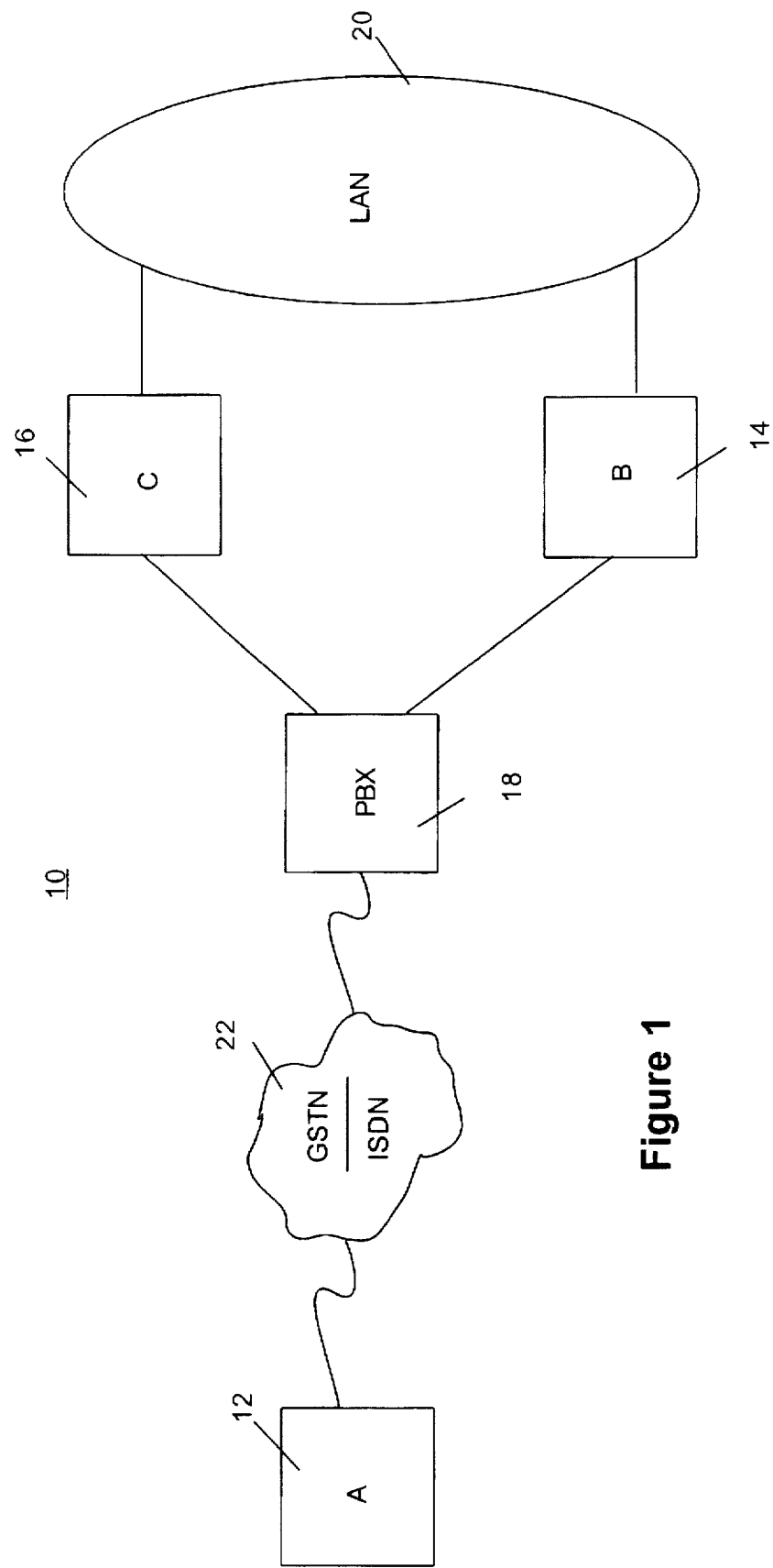
FIG. 1 illustrates an exemplary network of DTEs incorporated with the teaching of the present invention.

Referring now to FIG. 1, wherein an exemplary network of DTEs is shown incorporated with the teachings of the present invention. As shown, the exemplary network of DTEs include DTEs 12, 14 and 16. DTE 14 and DTE 16 are coupled to PBX 18. Additionally, for the illustrated embodiment, DTEs 14 and 16 are coupled to an alternate connection, shown here as local area network (LAN) 20. DTE 12 conducts data communication with DTE 14 or DTE 16 through a public switching network 22 and PBX 18.

Public switching network 22 may be a general switching telephone network (GSTN) or ISDN or the like, depending on the type of communication interface devices included in DTEs 12, 14 and 16. The communication interface devices may be analog or SVD modems, in which case, public switching network 22 would be GSTN. In other words, the connection between DTE 12 to DTE 14 or 16 is a POTS connection. On the other hand, if the communication interface devices are ISDN based, public switching network 22 would be ISDN. The connection between DTE 12 to DTE 14 or 16 is an ISDN connection.

Figure 2:
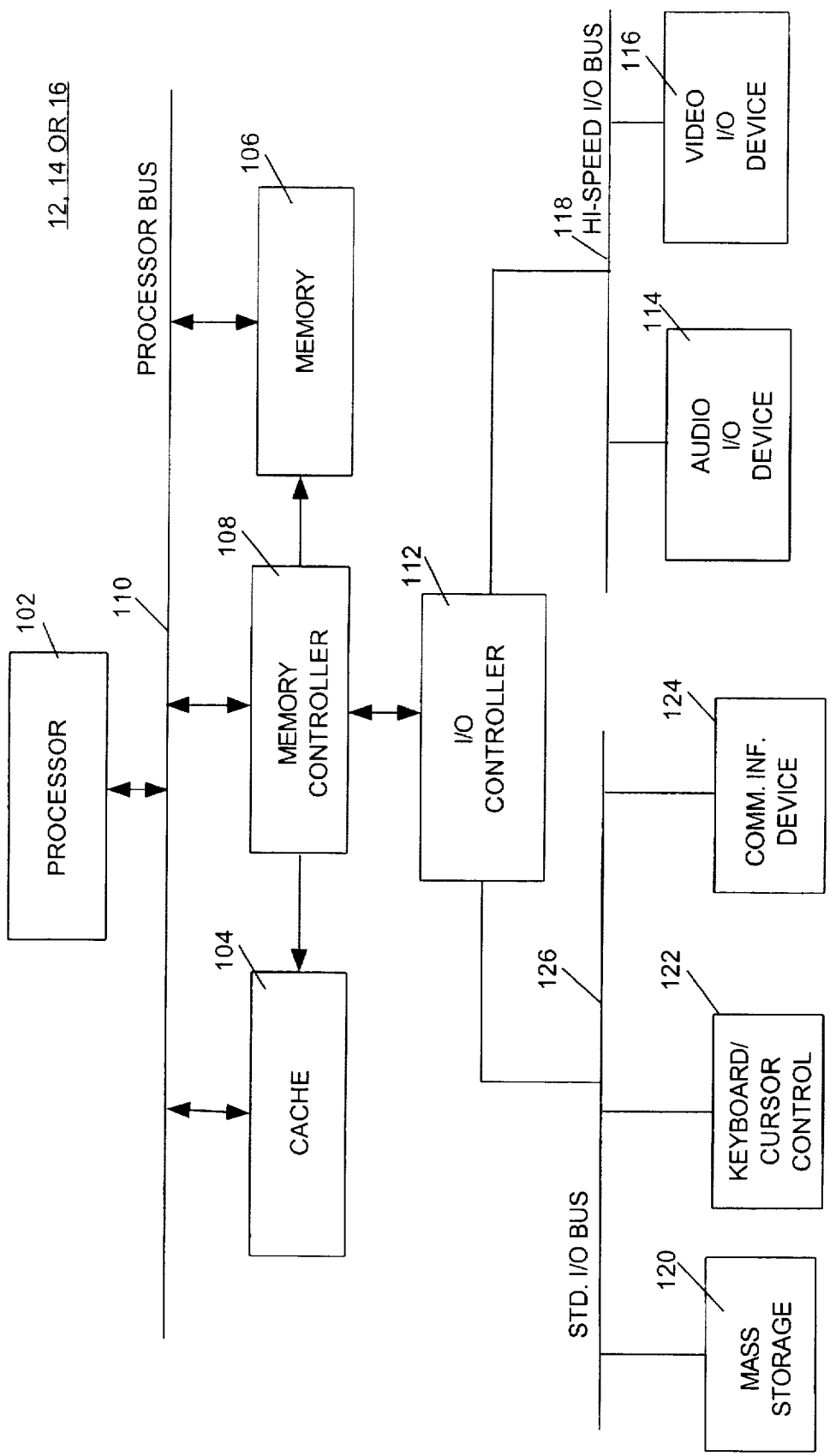
FIG. 2 illustrates one embodiment of a DTE of FIG. 1.

FIG. 2 illustrates an exemplary embodiment of DTE 12, 14 and 16 of FIG. 1. As shown, DTE 12, 14 or 16 includes processor 102, cache 104, memory 106, memory controller 108 and processor bus 110 coupled to each other as illustrated. Furthermore, DTE 12, 14, or 16 includes I/O controller 112 coupled to a standard I/O bus 126 and to a high-speed I/O bus 118. Coupled to standard I/O bus 126 are mass storage 120, keyboard 122 (including a cursor control device such as a mouse), and communication interface device 124. Coupled to high speed I/O bus 118 are video I/O devices 116 such as a display and/or a camera, and audio I/O device 114 such as a microphone and speakers.

Communication interface device 124 is incorporated with the teachings of the present invention, to be more fully described below. Other elements perform their conventional functions, whose constitutions are well known and will not be further described. Based on the description to follow, a person skilled in the art will appreciate that the present invention may be practiced without some of the illustrated elements or with other additional elements. The illustrated embodiment is intended to represent a broad category of DTEs known in the art including but not limited to personal computer systems based on Intel® Architecture Processors. Additionally, it should also be noted that while communication interface device 124 is being shown as an independent device "internal" to the host DTE, the present invention may also be practiced on independent communication interface devices that are external to the DTEs. Nevertheless, for ease of explanation, the coupled DTE shall still be referred to as the "host" DTE. Furthermore, it is anticipated that the present invention can also be practiced on "compound function devices" such as an I/O controller having integrated communication interface functions, as the technology of integration continues to advance.

Figure 3A:
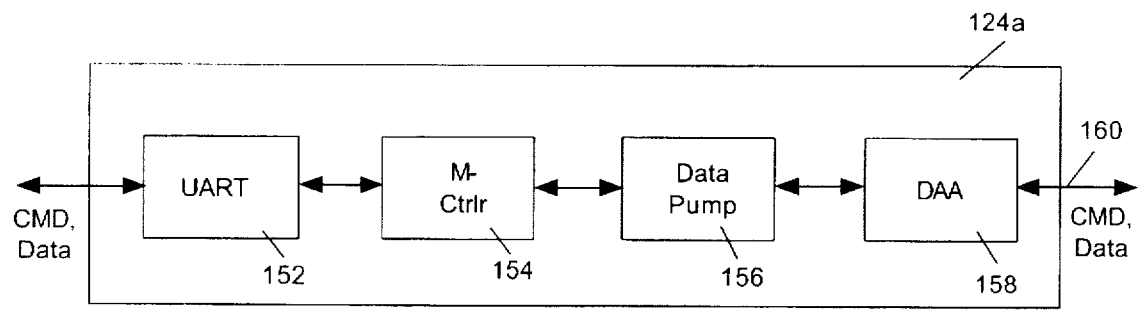
FIGS. 3a–3c illustrate three embodiments of the communication interface device of FIG. 2.
Figure 3B:
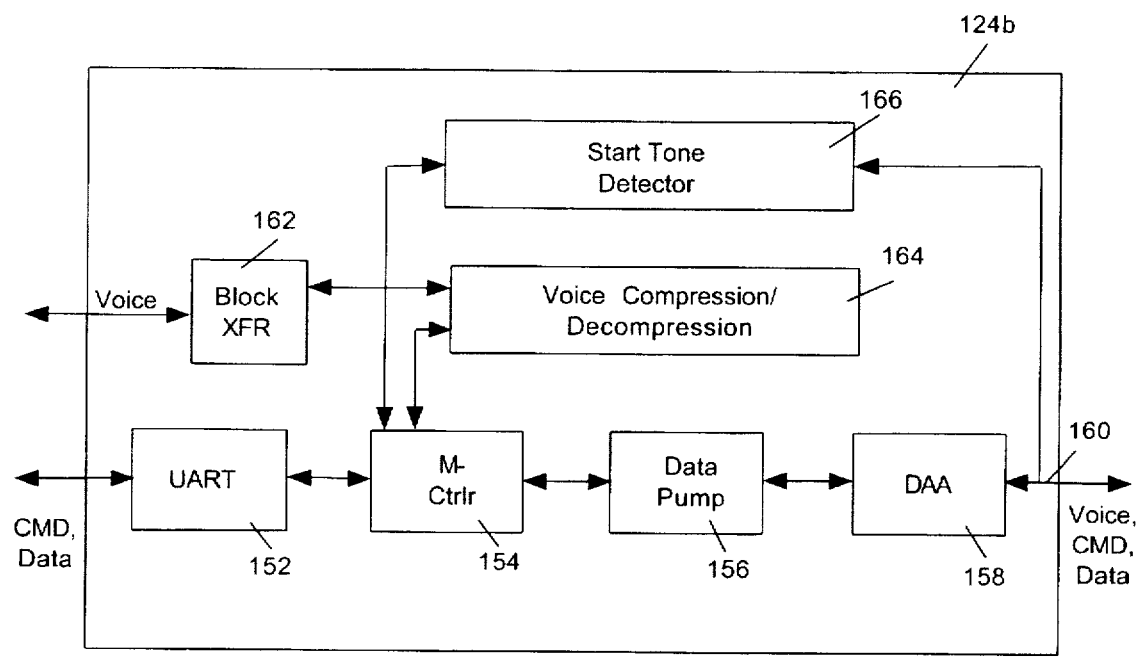
Figure 3C:
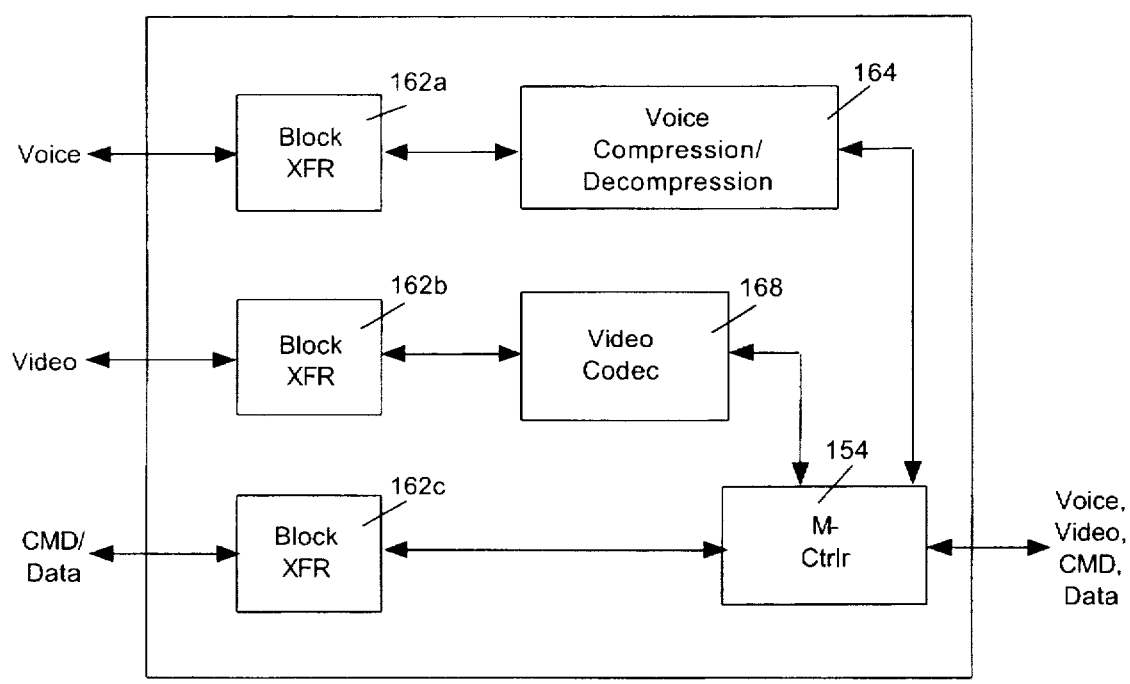

FIGS. 3a–3c illustrate three exemplary embodiments of the communication interface device shown in FIG. 2. Communication interface device 124a of FIG. 3a is intended to represent a broad category of conventional analog modems, each having an UART interface 152 to the rest of the "host" DTE, microcontroller 154 for controlling the overall operation of the device, data pump 156 for sending and receiving data, and DAA 158 for actually placing the data as electrical signals onto line 160.

Communication interface device 124b of FIG. 3b is intended to represent a broad category of SVD modems, each having, in addition to UART 152, microcontroller 154, data pump 156 and DAA 158, a block transfer interface 162 for transferring digitized voice signals to and from the "host" DTE, integrated voice compression/decompression circuitry 164 for compressing and decompressing digitized voice signals, and a start tone detector 166 for providing certain voice and/or data operation control signals to microcontroller 154. Voice and data are multiplexed under the control of microcontroller 154.

Communication interface device 124c of FIG. 3c is intended to represent a broad category of ISDN based communication interface devices, each having, in addition to microcontroller 154, first block transfer interface 162a (for transferring voice), voice compression/decompression circuitry 164, two additional block transfer interfaces 162b and 162c for transferring video and data (including commands) respectively, and video CODEC 168 for encoding and decoding video signals. Voice and Video/Data are also multiplexed under the control of microcontroller 154.

In each case, microcontroller 154 is incorporated with initialization and operating logic for operating the communication interface device 124a–124c in a manner that's suitable for the type of connection(s) supported, which includes the initialization and operating logic for jointly establishing a connection and data communication protocol. Particular examples of data communication protocol includes ITU's V.42 for a POTS connection and V.120 for an ISDN connection. Furthermore, the initialization and operating logic are incorporated with the teachings of the present invention for supporting transfer of a direct inward dial data call through a PBX, to be described more fully below. Except for these teachings of the present invention, communication interface devices 124a–124c are well known in the art, and will not be otherwise further described.

Figure 4A:
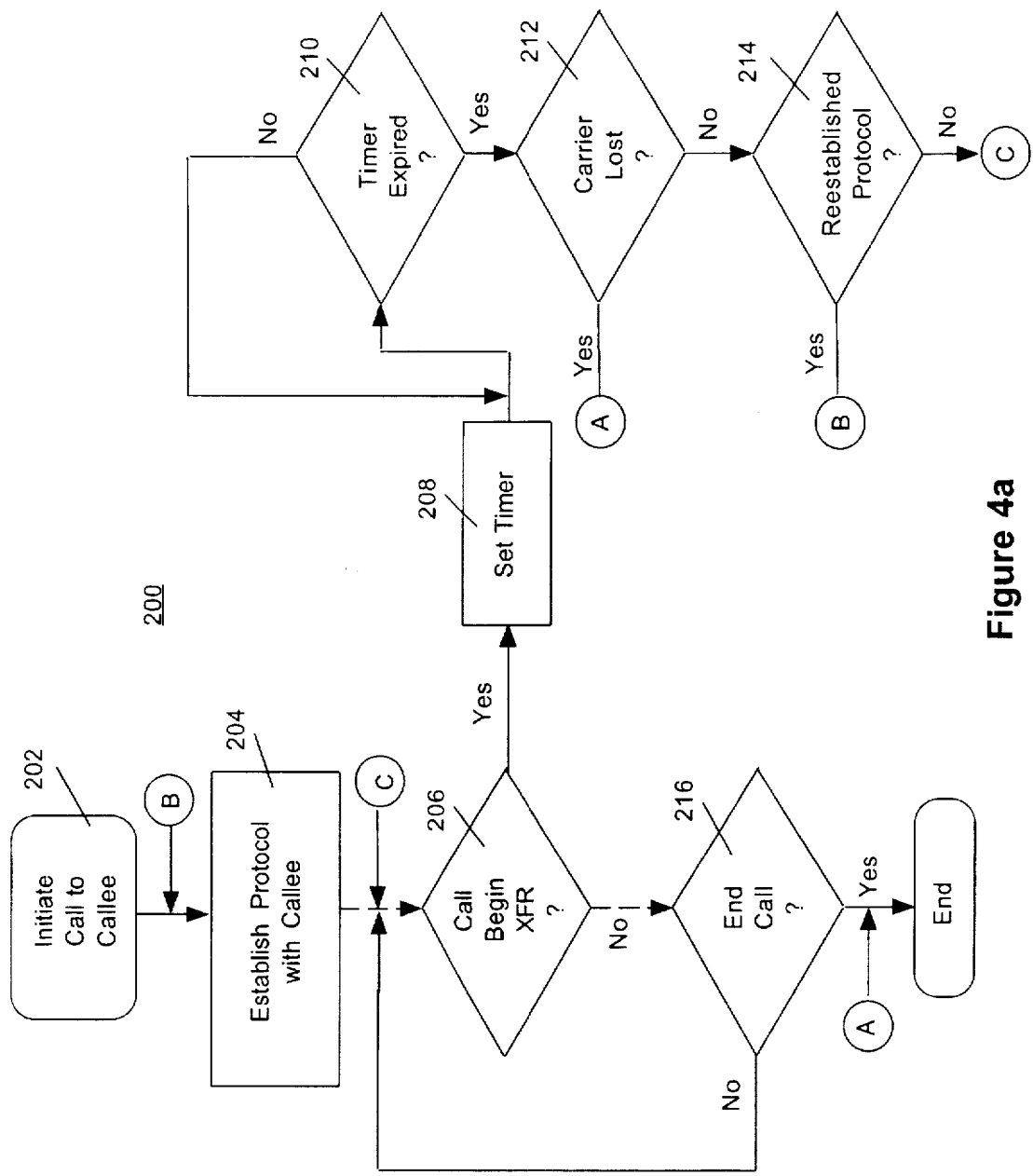
FIGS. 4a–4c illustrate one embodiment each of the improved operational flow of the caller, callee (transferor) and the transferee communication interface devices.
Figure 4B:
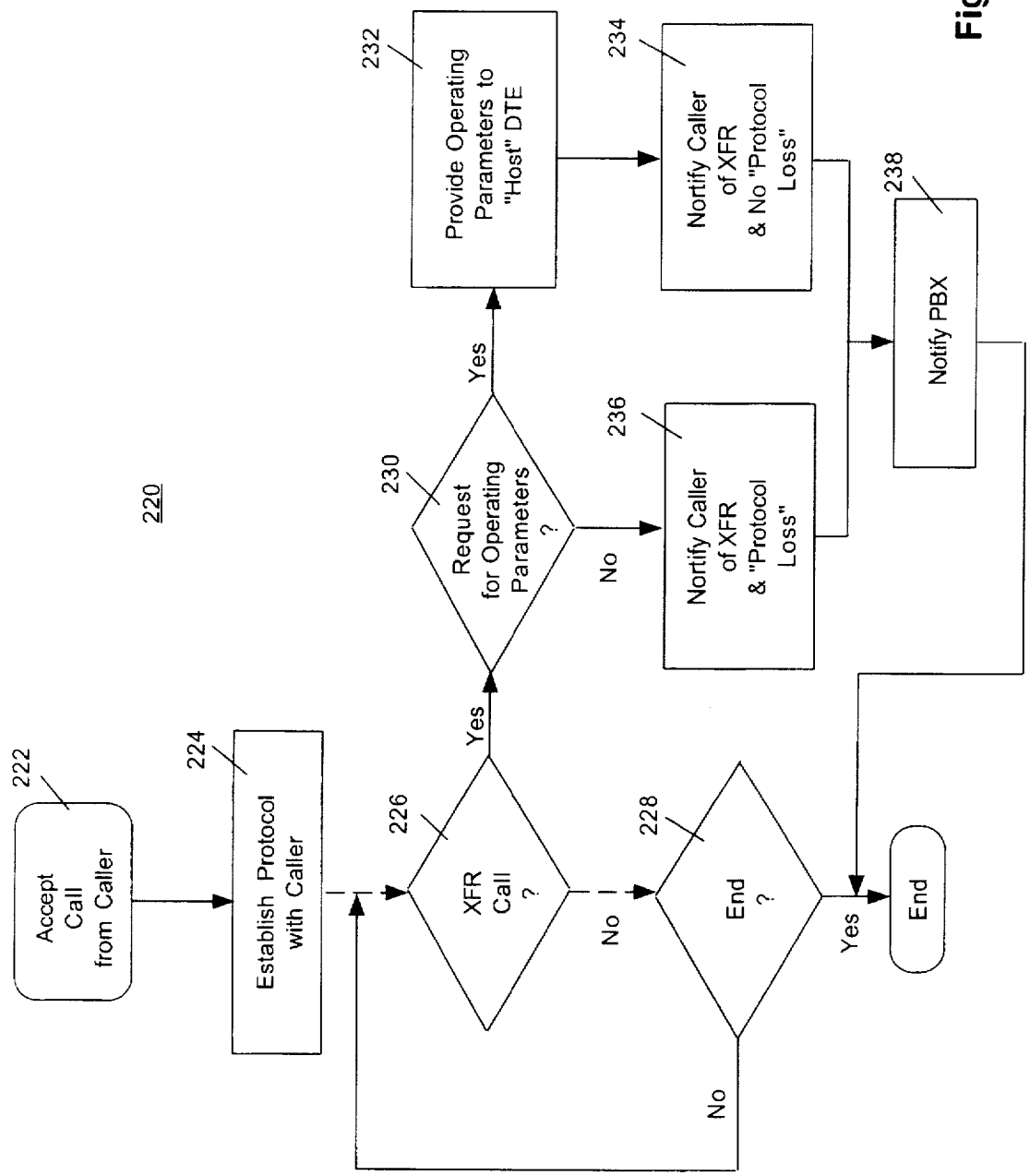
Figure 4C:
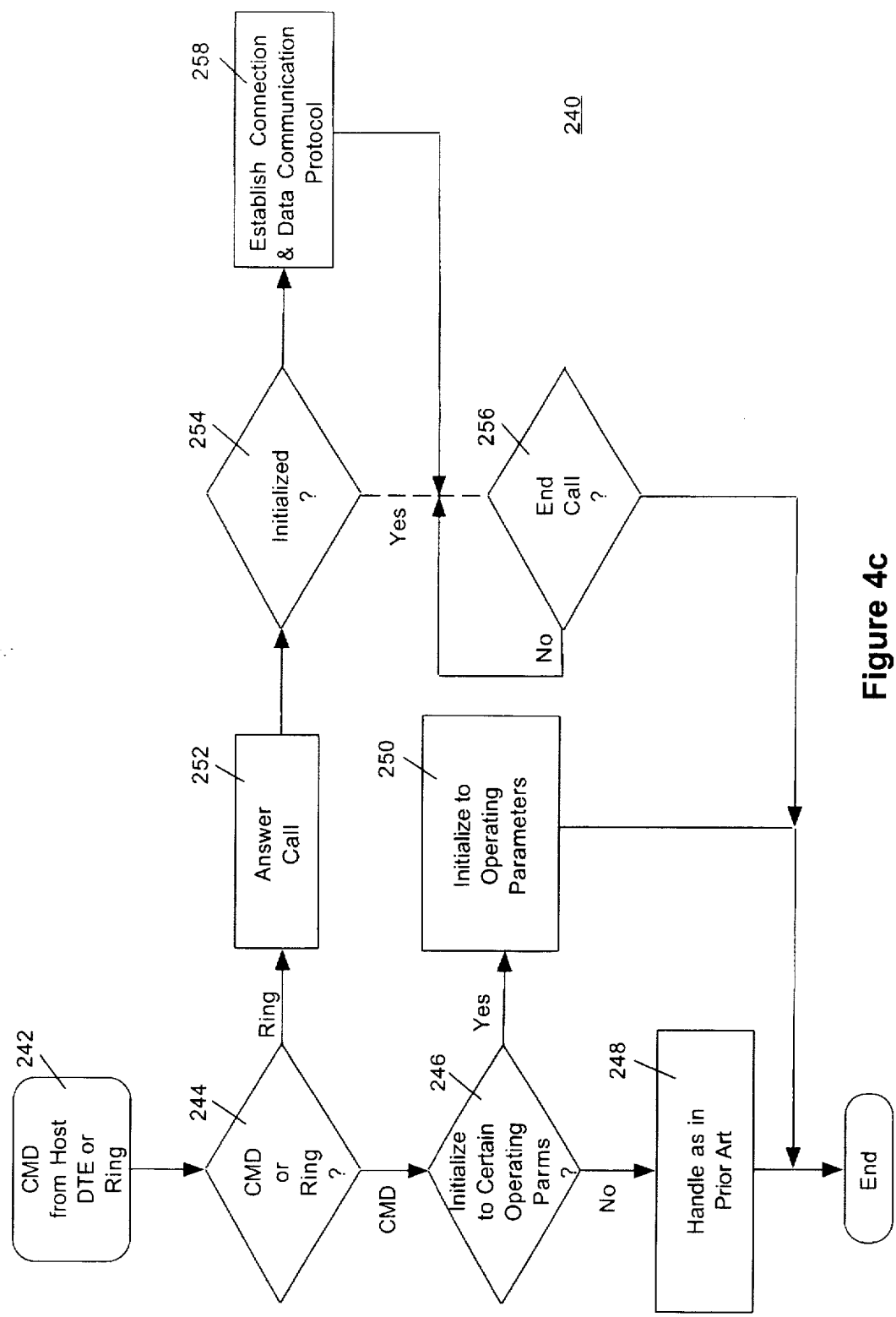

FIGS. 4a–4c illustrate the teachings of the present invention in the cases of a caller, a transferor callee, and a transferee callee, respectively. As shown in FIG. 4a, as in the prior art, as a caller, communication interface device 124a, 124b, or 124c (hereinafter 124*) initiates a direct inward dial data call to a callee communication interface device 124*, step 202. The two communication interface devices 124* jointly establish the connection including the data communication protocol in accordance with a protocol both of them support, e.g. ITU V.24 or V.120, step 204. Among other things, the two communication interface devices 124* jointly establish the data rate, whether error correction is going to be used, whether compression/decompression will be employed, and if so, the compression/decompression technique or character string etc. Upon establishing the connection and data communication protocol, the two communication interface devices 124* proceed to exchange data on behalf of their host DTEs 12 and 14.

However, in accordance with the present invention, the operating logic of communication interface device 124* is enhanced, when acting as a caller, to detect notification from the callee that the direct inward dial data call is being transferred, step 206. In one embodiment, the notification includes whether the caller communication interface device 124* should assume loss of protocol when the transfer is completed, to be described more fully below. Such notification may be implemented in a variety of manners, e.g. via an XID frame if the call is conducted using one of ITU's V series protocols. If no such notification is detected, the operating logic proceeds as in the prior art, and eventually terminates the call if a termination condition is detected, step 216.

On the other hand, if a transfer notification is detected at step 206, the operating logic is enhanced to temporarily suspend looking for the carrier signal from the callee if the caller communication interface device is a modem. On the other hand, if the caller communication interface device is an ISDN interface, the operating logic is enhanced to temporarily suspend looking for the frame alignment signal from the callee. For the illustrated embodiment, the operating logic sets a timer for a predetermined amount of time, step 208. During this period, the operating logic stops detecting for the carrier/frame alignment signal from the callee, step 210. Alternatively, the operating logic ignores the "prolonged" absence of the carrier/frame alignment signal from the callee. At the end of the time period, the operating logic resumes looking for the carrier/frame alignment signal from the callee, step 212. If there's still no carrier/frame alignment signal from the callee, the operating logic terminates the call. If the carrier/frame alignment signal from the callee is detected again and the communication interface device 124* was previously notified to assume loss of protocol, step 214, the operating logic initiates a retraining procedure, step 204, otherwise, the operating logic simply proceeds to operate as if the call has not been transferred.

The amount of time caller communication interface device 124* temporarily suspends looking for the carrier/frame alignment signal from the callee should be sufficiently long to allow the call to be transferred through a PBX. The actual time value may be empirically determined. In one embodiment, it is set at 200 ms.

As shown in FIG. 4b, as in the prior art, as a callee, the operating logic accepts the direct inward dial data call, step 222. As described earlier, the two communication interface devices 124* jointly establish the connection and data communication protocol, step 224. Once the connection and the data communication protocol is established, the operating logic proceeds to operate as in the prior art.

However, in accordance with the present invention, the operating logic is enhanced to detect for an instruction from the "host" DTE to transfer the call to a transferee callee, step 226. In one embodiment, in addition to the transferee callee identification, the instruction also includes a request for the operating parameters of the call. The "host" DTE of transferor communication interface device 124* requests the operating parameters, if it has an alternate connection to the "host" DTE of the transferee communication interface device 124*. The instruction/request may be implemented in a variety of manners, using for example an escape sequence to distinguish the instruction/request from normal data traffic. If no such instruction/request was detected, the operating logic proceeds to operate communication interface device 124* as in the prior art, and eventually terminates the call if one of the termination conditions is detected, step 228.

On the other hand, if an instruction to transfer the call is detected at step 226, the operating logic further determines if the "host" DTE has previously requested the operating parameters for the call, step 230. If the "host" DTE has not previously requested the operating parameters, the operating logic notifies the caller communication interface device 124* that the call is being transferred, and it should assume loss of protocol at the end of the transfer, step 236. If the "host" DTE has previously requested the operating parameters, the operating logic provides the operating parameters to the "host" DTE, step 232. Then, the operating logic notifies the caller communication interface device 124* that the call is being transferred, but without telling the caller communication interface device 124* that it should assume loss of protocol at the end of the transfer, step 234. In either case, upon notifying the caller communication interface device 124*, the transferor callee communication interface device 124* notifies the PBX to transfer the call to the transferee callee communication interface device 124*.

As shown in FIG. 4c, as in the prior art, transferee communication interface device 124* responds to either commands from its "host" DTE or the ring signal, step 242. Upon receipt of a command, the operating logic determines whether the command is for initializing the communication interface device 124* to a certain set of operating parameters, step 246. If the command is for such initialization, the operating logic initializes the communication interface device 124* accordingly, step 250. The operating parameter set is provided by the "host" DTE, who received them from the "host" DTE of the transferring communication interface device 124*. If it is one of the conventional commands, then the operating logic handles the conventional command as in the prior art, step 248.

On the other hand, upon receipt of a ring, beside answering the call, step 252, the operating logic additionally determines if the communication interface device 124* has been previously initialized to a certain set of operating parameters in response to a request from the "host" DTE, step 254. If the communication interface device 124* has not been previously so initialized, the operating logic proceeds to jointly establish the connection and data communication protocol as in the prior art, step 258. Upon establishing the data communication protocol, the operating logic proceeds to operate the communication interface device 124* also as in the prior art, until eventually a call termination condition is detected, and the operating logic terminates the call, step 256.

However, if it was detected at step 254 that the communication interface device 124* has previously been initialized to certain set of operating parameters, in response to a request from the "host" DTE, the operating logic proceeds immediately to operate the communication interface device 124* without going through the "negotiation" steps, as if those steps had been performed. Similarly, the operating logic will operate communication interface device 124* until the call is terminated.

For ease of understanding, the enhancement to the operating logic has been described separately in terms of the enhancements to allow the various communication interface devices to act as a caller, as a transferor callee, and as a transferee callee. Obviously, a communication interface device may be a caller at one point in time, a transferor callee at another time, and a transferee callee at yet another point in time. Therefore, communication interface device 124* is preferably provided with all three types of enhancements to allow communication interface device 124* to act in each of the three different roles at different points in time.

Thus, a method and apparatus for transferring a data call through a PBX has been described. While the method and apparatus of the present invention has been described in terms of the above illustrated embodiments, those skilled in the art will recognize that the invention is not limited to the embodiments described. The present invention can be practiced with modifications and alterations within the spirit and scope of the appended claims. The description is thus to be regarded as illustrative instead of restrictive on the present invention.

What is claimed is:

1. An apparatus comprising improved operating logic for conducting a data call, wherein the improvement includes operating logic for comprehending a notification from an opposing party of the data call that the data call is being transferred to a transferee, operating logic for temporarily suspending monitoring for loss of connection in response to said comprehension to facilitate said transfer of said data call, and resuming said monitoring at a subsequent point in time, operating logic for comprehending from the notification that the apparatus is to assume loss of protocol after the data call is transferred to the transferee, and operating logic for initiating a retraining procedure subsequent to resumption of monitoring for loss of connection, if the apparatus was informed by the opposing party to assume loss of protocol after the data call is transferred to the transferee.

2. The apparatus as set forth in claim 1, wherein the operating logic for temporarily suspending monitoring for loss of connection comprises operating logic for temporarily suspending monitoring for a carrier signal.

3. The apparatus as set forth in claim 1, wherein the operating logic for temporarily suspending monitoring for loss of connection comprises operating logic for temporarily suspending monitoring for a frame alignment signal.

4. The apparatus as set forth in claim 1, wherein the apparatus is a communication interface device.

5. The apparatus as set forth in claim 1, wherein the apparatus is a computer system.

6. The apparatus as set forth in claim 1, wherein the apparatus is a communication device.

7. An apparatus comprising improved operating logic for conducting a data call, wherein the improvement includes operating logic for determining that the data call is to be transferred to a transferee, operating logic for notifying an opposing party of the data call that the data call is being transferred, operating logic for transferring the data call to the transferee, and operating logic for transferring a plurality of operating parameters to the transferee for use by the transferee to conduct the data call with said opposing party of the data call, via an alternate connection, if the alternate connection exists between the apparatus and the transferee.

8. The apparatus as set forth in claim 7, wherein the operating logic for transferring the data call includes operating logic for instructing an exchange to transfer the data call to the transferee.

9. The apparatus as set forth in claim 7, wherein the apparatus is a communication interface device.

10. The apparatus as set forth in claim 7, wherein the apparatus is a computer system.

11. The apparatus as set forth in claim 7, wherein the apparatus is a communication device.

12. The apparatus as set forth in claim 7, wherein the operating logic for transferring the data call first transfers the plurality of operating parameters to the transferee through a first connection coupling the apparatus to the transferee, then transfers the data call to the transferee through a second connection coupling the apparatus to an exchange, through which the data call was originally established, and to which the transferee is also coupled, the first and second connections being different connections.

13. The apparatus as set forth in claim 12, wherein the first connection is a local area network, and the exchange is a private access branch exchange (PBX).

14. An apparatus comprising improved operating logic for conducting a data call, the improvement including operating logic for accepting the data call from a transferor through a first connection connecting the apparatus to an exchange, including pre-establishing a plurality of operating parameters for the data call, if pre-provided by the transferor through a second connection connecting the apparatus to the transferor, the first and second connections being different connections, and answering the data call, skipping a number of set up steps for jointly establishing the plurality of operating parameters with a transferred party when answering the data call, if the operating parameters have been pre-established.

15. The apparatus as set forth in claim 14, wherein the operating logic for accepting the data call pre-receives the plurality of operating parameters from the transferor through the second connection, in response, pre-establishes the operating parameters in preparation for the transfer of the data call, then answers the data call on the first connection.

16. The apparatus as set forth in claim 15, wherein the first connection is a local area network, and the exchange is a private access branch exchange (PBX).

17. The apparatus as set forth in claim 14, wherein the apparatus is a communication interface device.

18. The apparatus as set forth in claim 14, wherein the apparatus is a computer system.

19. The apparatus as set forth in claim 14, wherein the apparatus is a communication device.

20. A method for a party to a data call to accommodate transfer of the data call by an opposing party of the data call, the method comprising the steps of:

(a) receiving and comprehending a notification from the opposing party that the data call is being transferred to a transferee, and that the party is to assume loss of protocol after the data call has been transferred if the notification includes instructions to the party to make the loss of protocol assumption;

(b) in response, temporarily suspending monitoring for loss of connection to provide time for the data call to be transferred, and then resuming monitoring for loss of connection at a subsequent point in time; and (c) initiating a retraining procedure subsequent to resuming monitoring for loss of connection if the party was instructed to assume loss of protocol after the data call has been transferred.

21. The method as set forth in claim 20, wherein step (b) comprises temporarily suspending monitoring for a carrier signal.

22. The method as set forth in claim 20, wherein step (b) comprises temporarily suspending monitoring for a frame alignment signal.

23. A method for a party to a data call to transfer the data call to a transferee, the method comprising the steps of:

(a) determining the data call is to be transferred;

(b) providing a call transfer notification to an opposing party of the data call that results in temporary suspension of monitoring by the opposing party for loss of connection, and pre-providing a plurality of operating parameters to a transferee through a first connection connecting the party to the transferee prior to transferring the data call; and (c) transferring the data call to the transferee during the temporary suspension through a second connection connecting the transferee to an exchange.

24. The method as set forth in claim 23, wherein step (c) comprises instructing an exchange to transfer the data call.

25. The method as set forth in claim 23, wherein the first connection is a local area network, and the exchange is a private access branch exchange (PBX).

26. A method for a party to answer a data call, the method comprising the steps of:

(a) pre-establishing a plurality of operating parameters for the data call, if the operating parameters are pre-provided by a transferor of the data call through a first connection connecting the party to the transferor;

(b) answering the data call through a second connection connecting the party to an exchange, the first and second connections being different connections; and (c) determining if the plurality of operating parameters have been pre-established, and skipping a number of set up steps for jointly establishing the operating parameters with an opposing party of the data call if the operating parameters have been pre-established.

27. The method as set forth in claim 26, wherein step (a) comprises pre-receiving the plurality of operating parameters from the transferor through the first connection.

28. The method as set forth in claim 27, wherein the first connection is a local area network, and the exchange is a private access branch exchange (PBX).

* * * * *